Dec. 29, 1925.
R. PEALE
1,567,330
COAL CONVEYER AND CONVEYING SYSTEM
Filed Jan. 13, 1919    9 Sheets-Sheet 1
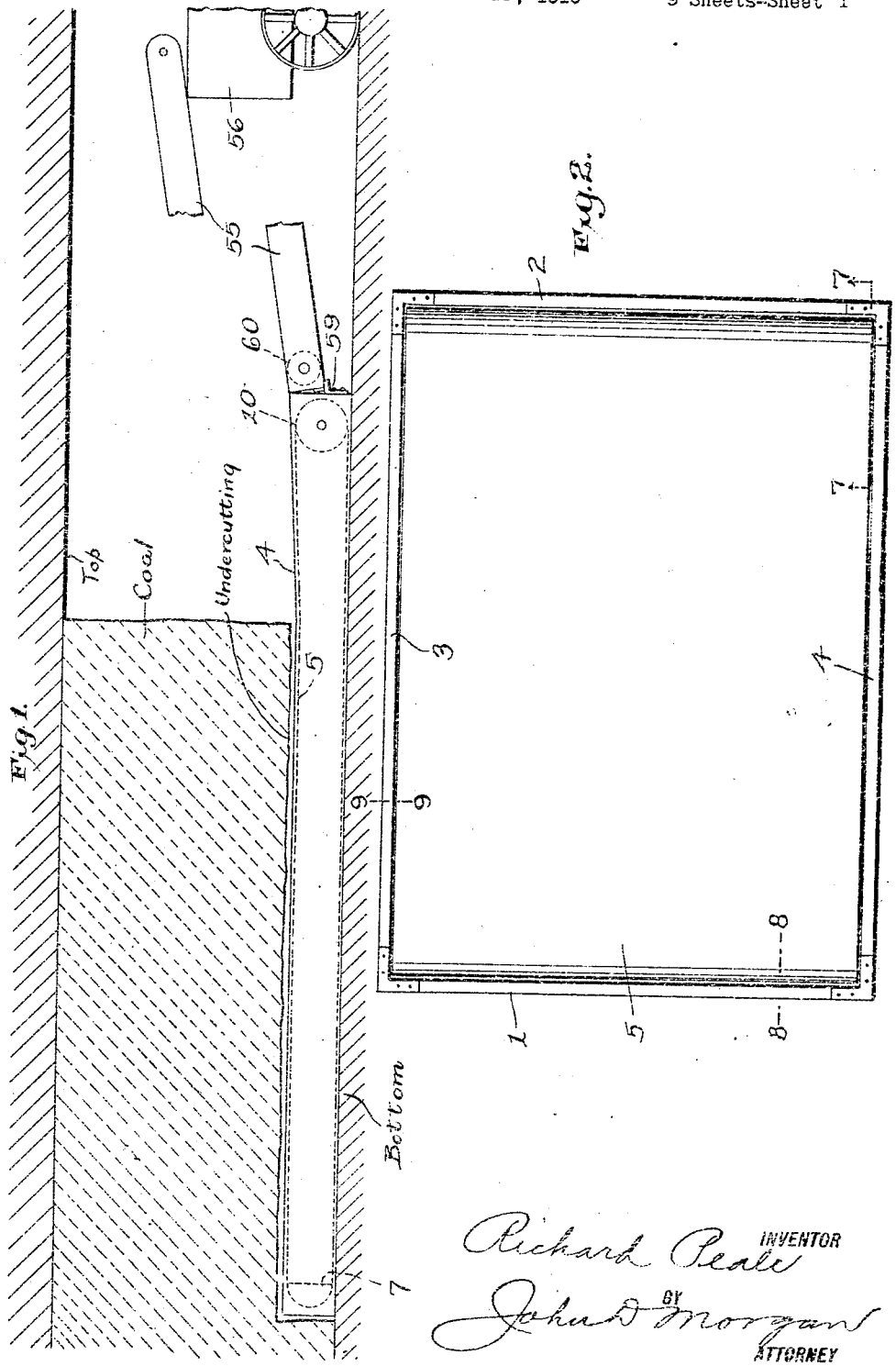

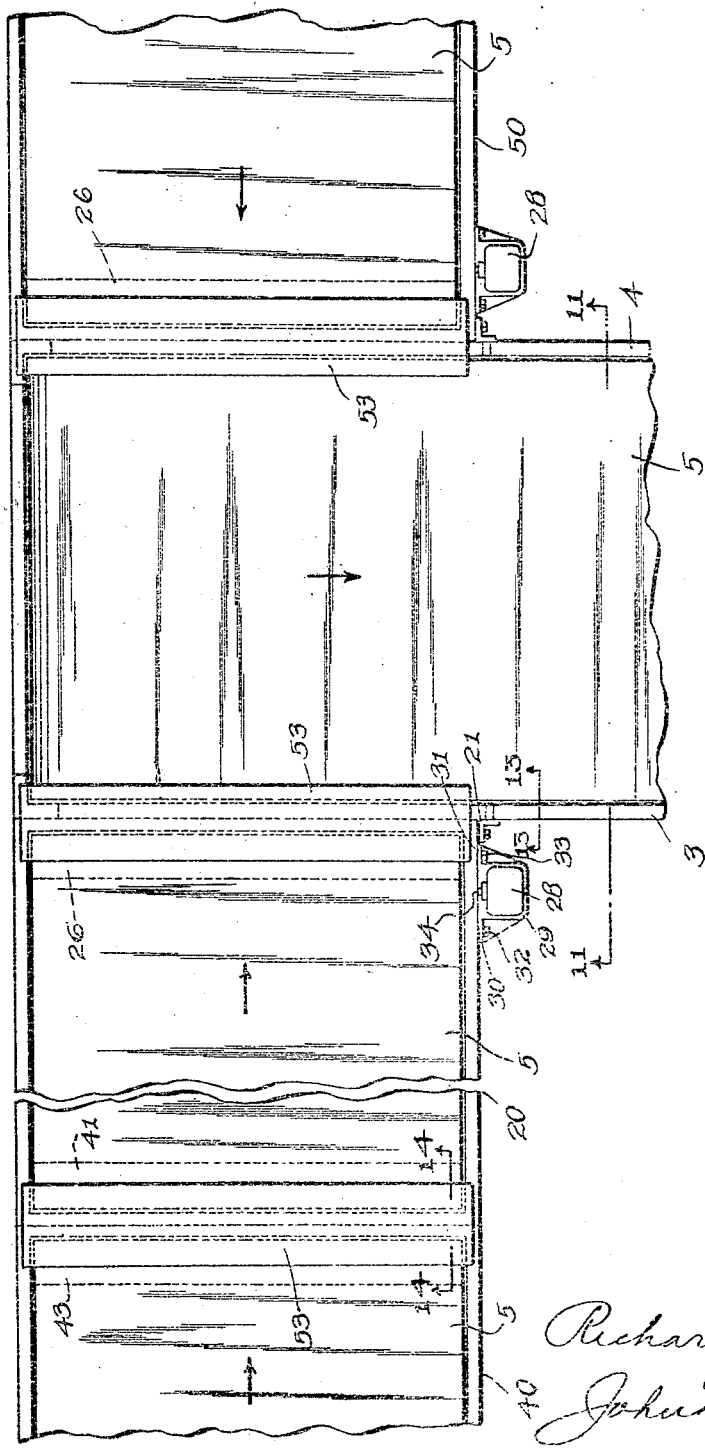

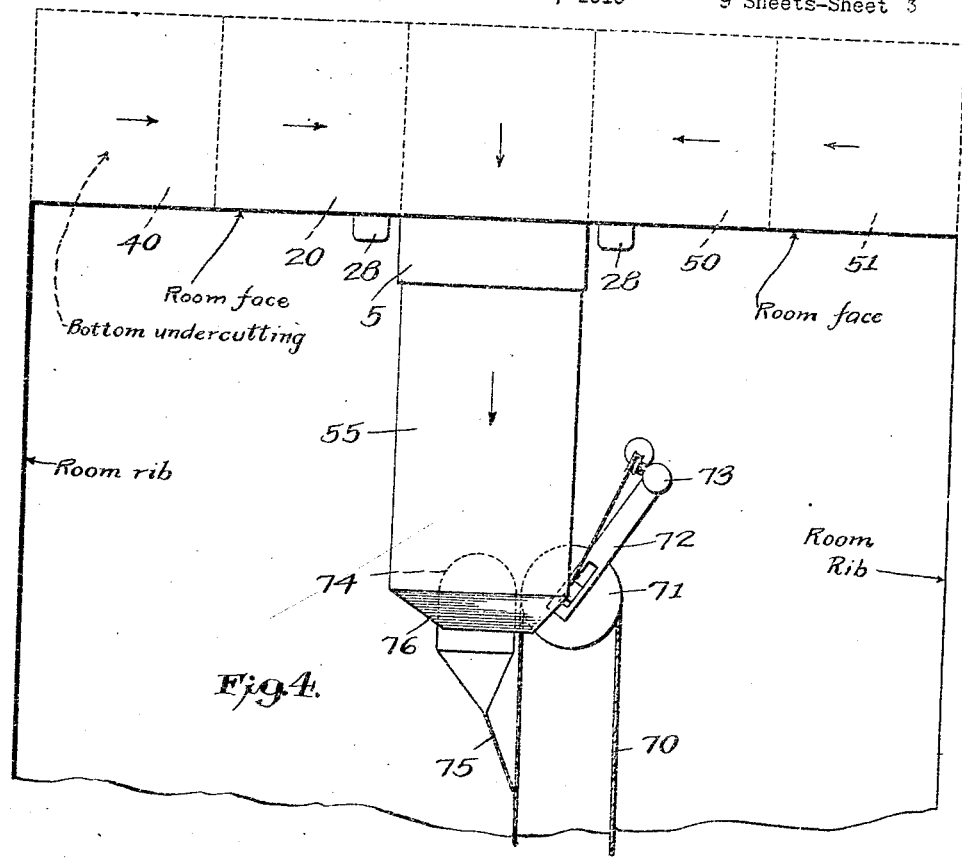
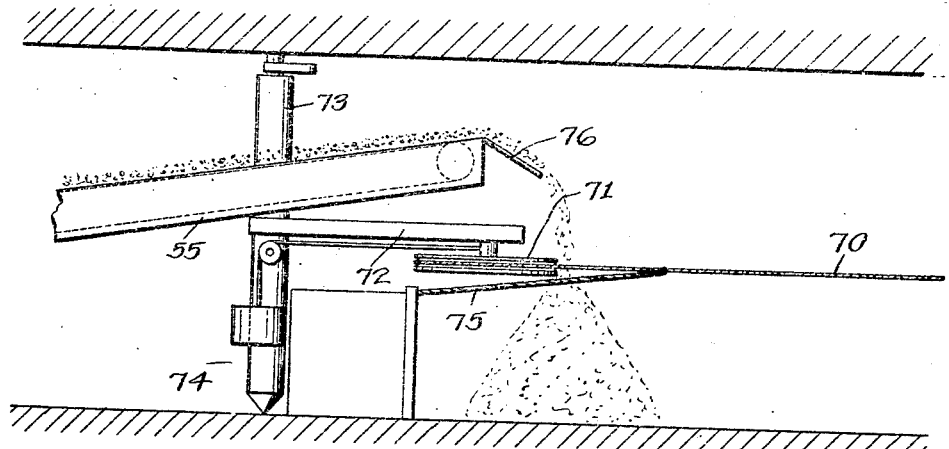

Dec. 29, 1925.
R. PEALE
1,567,330
COAL CONVEYER AND CONVEYING SYSTEM
Filed Jan. 13, 1919    9 Sheets-Sheet 4
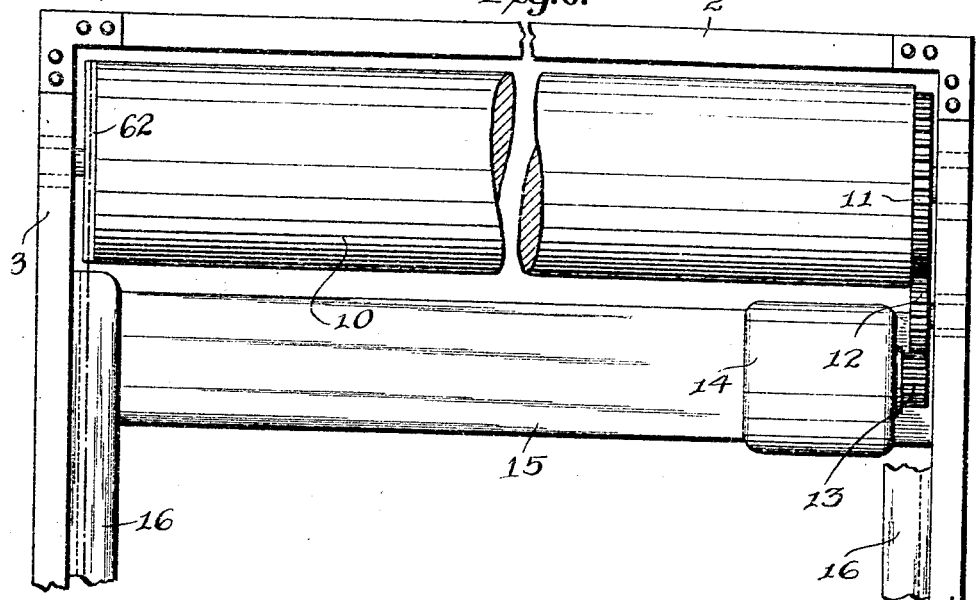
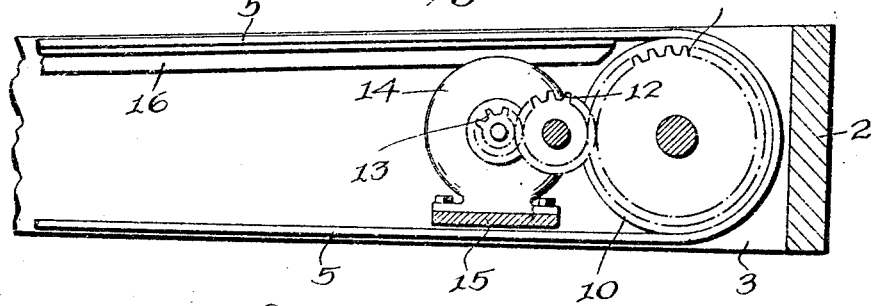
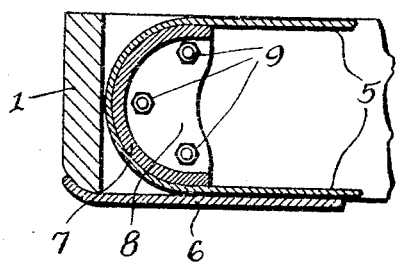
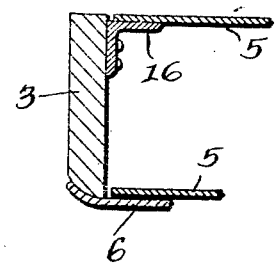
INVENTOR
Richard Peale
BY
John D Morgan
ATTORNEY Dec. 29, 1925.
R. PEALE
1,567,330
COAL CONVEYER AND CONVEYING SYSTEM
Filed Jan. 13, 1919          9 Sheets-Sheet 5
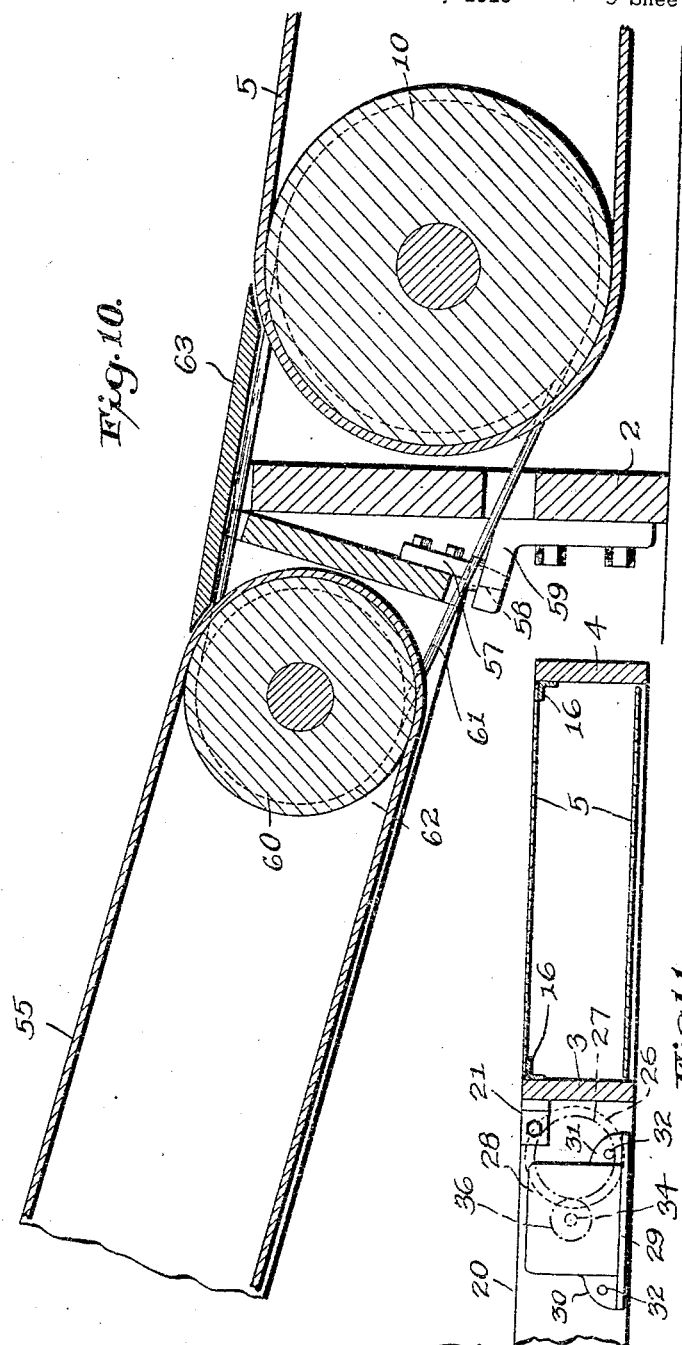
INVENTOR
Richard Peale
BY
John D Morgan
ATTORNEY

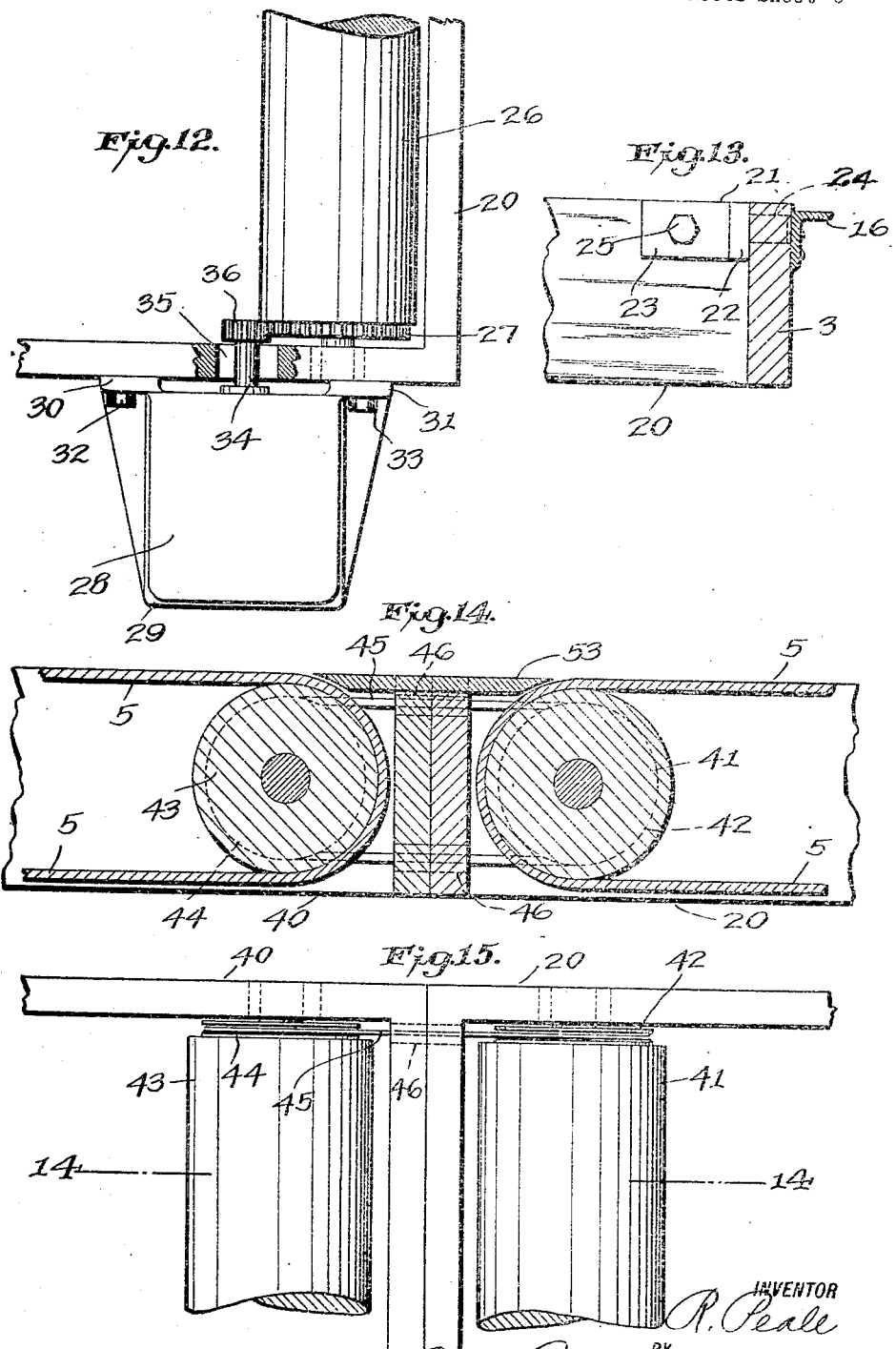

Dec. 29, 1925.
R. PEALE
1,567,330
COAL CONVEYER AND CONVEYING SYSTEM
Filed Jan. 13, 1919  9 Sheets-Sheet 7
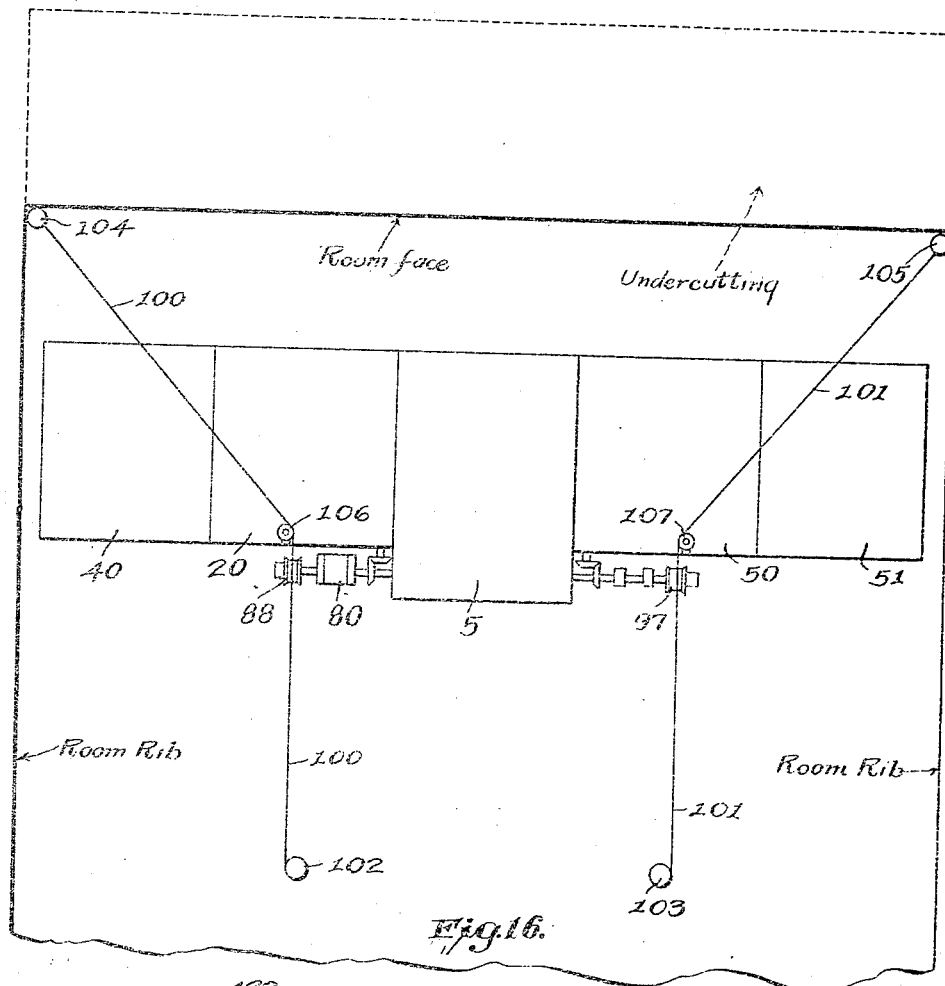
Fig.16.
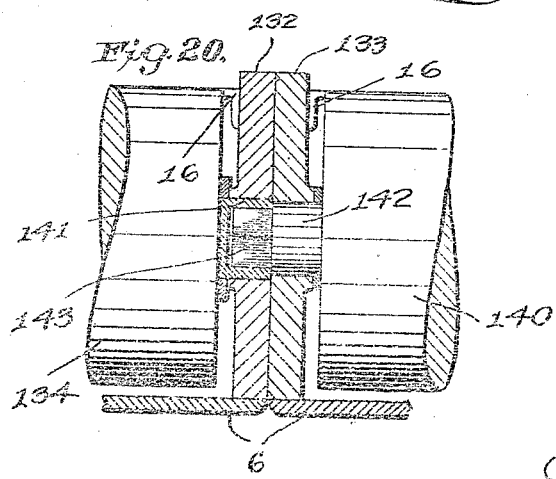
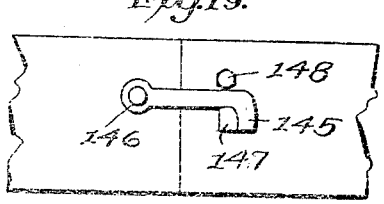
Richard Peale INVENTOR
John H. Morgan BY ATTORNEY

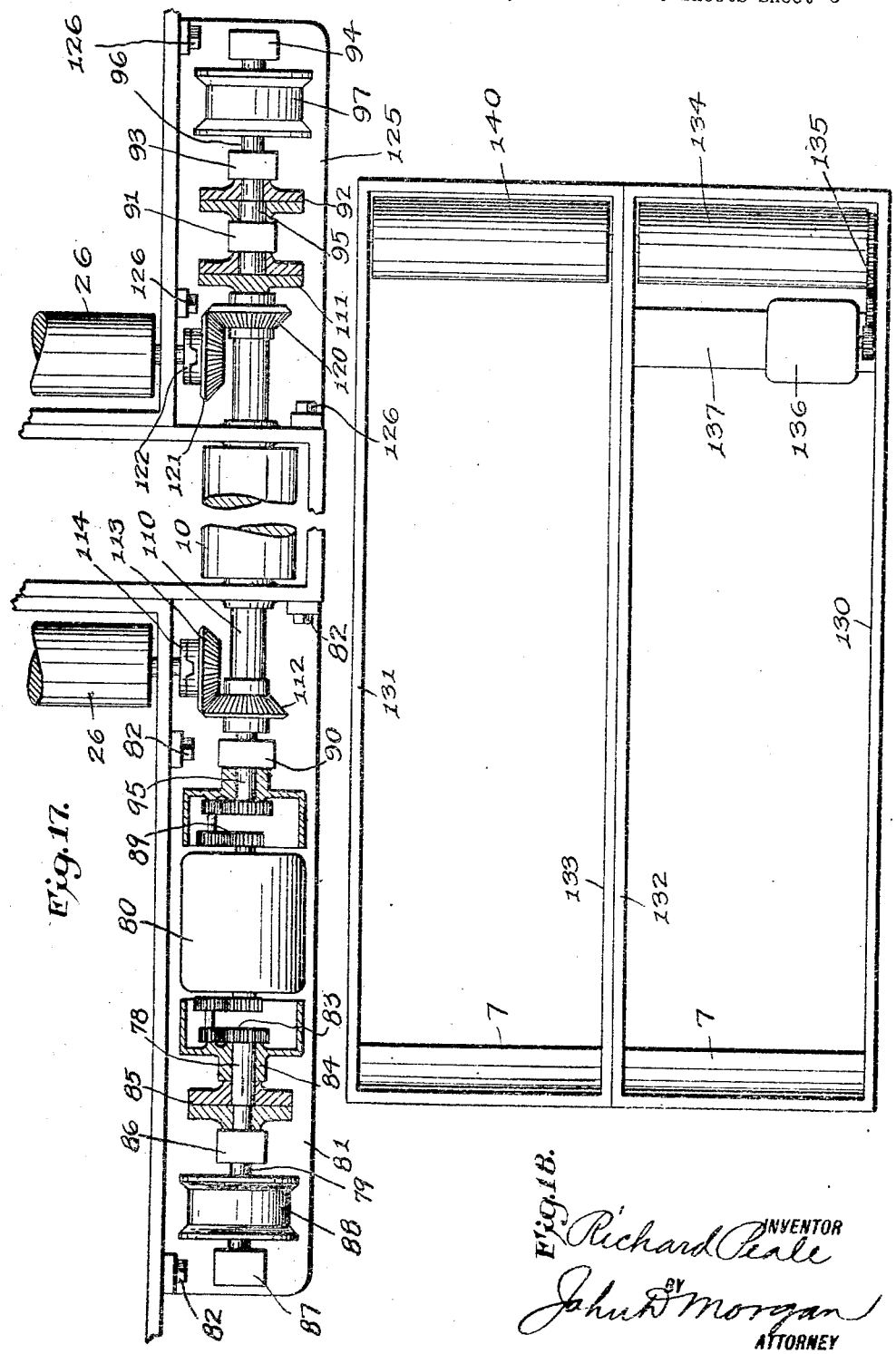

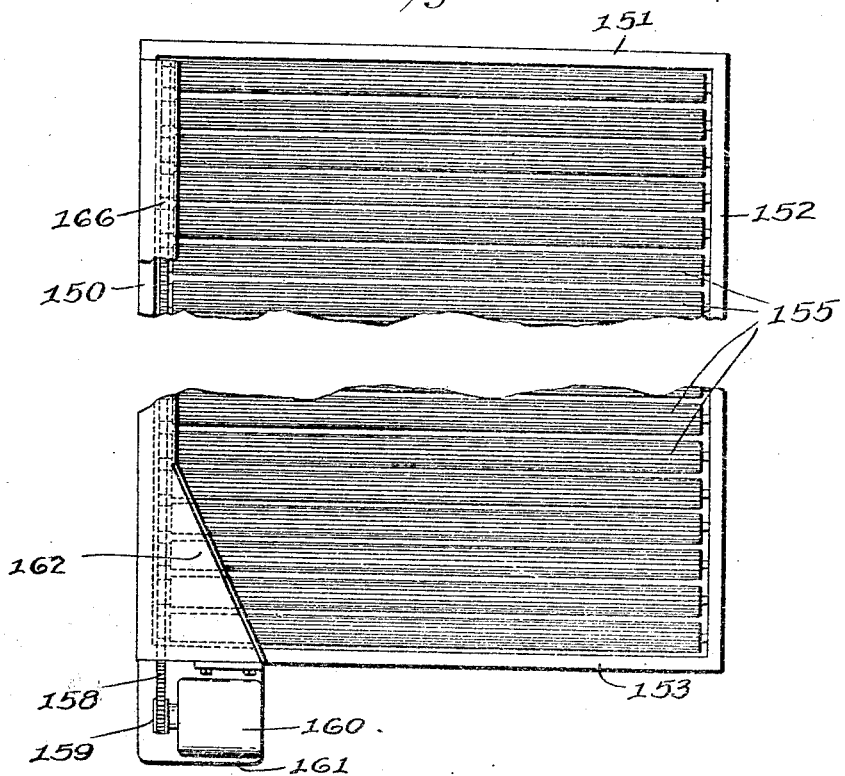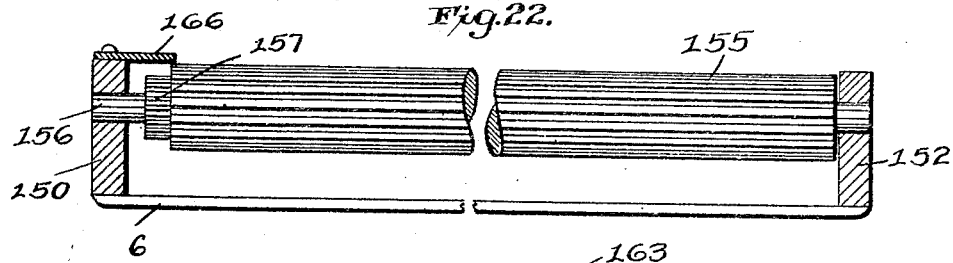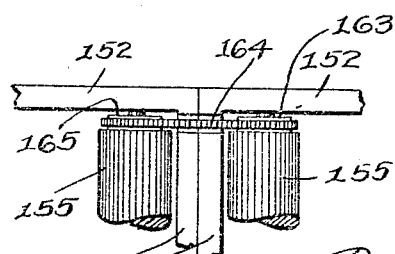

Patented Dec. 29, 1925.

1,567,330

UNITED STATES PATENT OFFICE.

RICHARD PEALE, OF ST. BENEDICT, PENNSYLVANIA, ASSIGNOR TO REMBRANDT PEALE, OF ST. BENEDICT, PENNSYLVANIA.

COAL CONVEYER AND CONVEYING SYSTEM.

Application filed January 13, 1919. Serial No. 270,909.

*To all whom it may concern:*

Be it known that I, RICHARD PEALE, a citizen of the United States, residing at St. Benedict, in the county of Cambria and State of Pennsylvania, have invented certain new and useful Improvements in Coal Conveyers and Conveying Systems, of which the following is a specification.

The invention relates to a system of mining and of conveying mined coal and to mechanism for use in coal mining and in conveying away mined coal.

The objects and advantages of the invention will be set forth in part hereinafter and in part will be obvious herefrom, or may be learned by practice with the invention.

The invention consists in the novel parts, constructions, arrangements, steps, systems, combinations and improvements herein shown and described.

The accompanying drawings, herein referred to and constituting a part hereof, illustrate one embodiment of the invention and together with the description serve to explain the principles thereof.

Of the drawings:—

Fig. 1 is a side elevation of a mechanism constructed in accordance with the invention, shown in working position in a mine;

Fig. 2 is a top plan of a conveyer section;

Fig. 3 is a top plan of a plurality of cooperating conveyers as they would be in an undercut or bottom kerf in a mine;

Fig. 4 shows in diagram a mine room with a set of conveyers in position in an undercut or bottom kerf, and in operative relation with a conveyer for taking the coal therefrom and for conveying it out of the room;

Fig. 5 is a detail elevation showing the right-hand end of the conveyer of Fig. 1 discharging to a scraper line conveyer for conveying the coal out of a room; this figure corresponds to the central part of Fig. 4;

Fig. 6 is an enlarged, fragmentary top plan of the outer end of the conveyer of Fig. 2, with the conveyer itself removed to show the mechanism;

Fig. 7 is a vertical fragmentary section, on an enlarged scale, taken substantially on the line 7—7 of Fig. 2;

Fig. 8 is a vertical fragmentary section, on an enlarged scale, taken on line 8—8 of Fig. 2;

Fig. 9 is a vertical fragmentary section, on an enlarged scale, taken on line 9—9 of Fig. 2;

Fig. 10 is a vertical fragmentary section, on an enlarged scale, of the juncture of the two cooperating conveyers, shown near the middle of Fig. 1, the section being taken just within the farther or inside conveyer frames;

Fig. 11 is a partial section and partial vertical elevation taken on line 11—11 of Fig. 3;

Fig. 12 is a fragmentary enlarged plan of the motor, conveyer, driving roll and cooperating parts shown near the center of Fig. 3;

Fig. 13 is a vertical fragmentary section, taken on line 13—13 of Fig. 3;

Fig. 14 is a vertical fragmentary section on line 14—14 of Fig. 3;

Fig. 15 is a fragmentary top plan, on an enlarged scale, and with the conveyers and material bridge removed to show the mechanism, and corresponds generally to Fig. 14;

Fig. 16 is a plan, partly diagrammatic, showing how the conveyer mechanism moves itself back to permit the mining machine to make a new cut and then moves itself forward into the under cut;

Fig. 17 is a fragmentary enlarged plan of an embodiment of the driving and moving mechanism;

Fig. 18 is a plan of a form of conveyer which is centrally separable for handling in low veins;

Fig. 19 shows a device for fastening the two cooperating parts of the conveyer together;

Fig. 20 is an enlarged fragmentary sectional view of the driving connection between the two parts of the double conveyer;

Fig. 21 is a plan of one form of conveyer unit;

Fig. 22 is a transverse section through Fig. 21; and

Fig. 23 is a fragmentary top plan of a driving connection between two conveyer units.

The invention provides a conveying mechanism and a system of conveyers adapted to directly receive the "shot-down", or otherwise dislodged coal without previous or intermediate handling and to convey the coal into cars either in the entry or in the room. The mechanism and system is adapted for use in entry or room work, long wall work and in any other system of mine operation.

It is furthermore very efficient in expeditiously and economically handling and conveying coal in relatively thin veins, but is adapted for use in thick veins as well.

In one manner of using the invention, the vein is undercut, preferably by machine, and a conveyer section, or a plurality of conveyer sections, are placed in the undercut or kerf along the mine bottom, and the coal is then shot down or otherwise dislodged, and falls upon the conveyer, and the conveyers are then started into operation. The dislodged coal is thereby rapidly and economically conveyed into the mine cars and the face of the working is very quickly cleared and ready to be again undercut by the mining machine or otherwise.

Referring to the particular embodiment illustrated by way of example in the accompanying drawings, a conveyer or conveyer section is provided adapted to be run or slid into the under or bottom kerf formed by a mining machine, preparatory to the dislodgment of the coal, either by "shooting down" or otherwise. This conveyer is preferably a complete unit, provided with its own motor, which is enclosed within the conveyer structure. The arrangement of such a section in an undercut kerf is shown in Fig. 1 of the drawings. This figure shows further a cooperating conveyer delivering the dislodged and broken-up coal into a mine car.

Such a conveyer as that above described is adapted for use in either narrow work, such as an entry or heading, or in wider work, such as room work or long wall work. For room work there is preferably provided by my invention a plurality of conveyers, all located within an undercut or bottom kerf, preferably extending all the way across the face of a room, these conveyers preferably conveying the coal, after it has been shot down or dislodged, across the face of the room to a what may be termed for convenience a principal or central conveyer which in turn conveys the coal outwardly, and either directly or by means of an additional conveyer, delivers it into the mine car. Such an arrangement is shown in Figs. 3 and 4.

Referring to the construction of the embodied form of conveyer section, or conveyer unit, which may be termed a central or principal conveyer, an exterior frame is provided consisting of end plates, 1 and 2, and side plates 3 and 4 all joined together. These plates are of a sufficient thickness to impart required strength and rigidity to the construction and are of a height such that they will pass readily into the undercutting or kerf made in the vein along the mine floor by the usual mining machine. This undercutting or kerf is usually about six inches high, but the invention is not limited to this or any particular dimension. The conveyer unit is preferably of a width which will make it applicable for use in the driving or excavating of entries or headings, and is preferably of a length greater than the undercut made by the mining machine, so that the conveyer unit preferably extends out from beneath the overhanging coal when the conveyer unit is inserted in the undercutting, as shown in Fig. 1.

The conveyer 5, is preferably an endless belt conveyer, of suitable form and material, the upper reach thereof being in the plane of the tops of the frame member or just a little lower, and the bottom reach running well within the bottom of the frame member. On the bottom of the frame there are provided shoes 6, which are preferably upwardly curved at their outer edges, as shown for example in Fig. 8, to permit easy sliding of the conveyer unit along the mine floor.

The conveyer 5, at its inner end runs over a suitable roller, or over a curved guide and support 7, which has at its ends plates 8 fixed to the side frames 3 and 4 in suitable manner, as by bolts 9. Suitable means are provided for driving the conveyer, and in the preferred embodiment a motor is located within the frame of the conveyer unit. Referring more especially to Figs. 1, 6 and 7, a driving roller 10 is journaled in the side frames 3 and 4, and is provided with a gear 11 at one end thereof. Gear 11 meshes with an idler 12 journaled on the side frame, and the idler 12 meshes in the pinion 13 of a motor 14. The motor 14 is supported upon a plate or shoe 15, extending across the bottom of the conveyer unit frame. The external part of the conveyer unit is preferably of greater height than the part which runs into the undercutting beneath the hanging coal, as shown in Fig. 1. This gives more room for the conveyer driving roller and the motor. There are preferably provided angle plates 16, fixed to the side frames 3 and 4 of the conveyer unit and extending along beneath and supporting the outer portions or edges of the conveyer 5.

Referring now more particularly to that feature of the invention, already briefly mentioned, wherein a plurality of cooperating conveyer units are associated or assembled in an undercutting extending all the way across the face of a room, as shown in Figs. 3 and 4, a central or principal unit is preferably employed such as the one just described, which has the conveyer running outwardly, that is away from the face of the work and towards a scraper line, a mine car, or other means for conveying the coal away from the work. The remaining conveyer units in the undercutting preferably have their conveyers running toward and discharging onto this principal or central conveyer. Thus when the coal is shot down, or otherwise dislodged, upon the conveyers, the central conveyer may be set in operation to convey away the coal which has fallen thereupon, and then the conveyers at either side may be started, either together or in succession, to convey the coal which has fallen thereupon onto the main conveyer to be conveyed thereby.

The general construction of these additional units may be generally similar to the central or principal conveyer already described. In practice, however, I prefer to have these conveyer units adapted to be driven by a detachable motor either individually, with a motor for each section, or in train, that is with a motor attached to one section and driving the conveyer for a plurality of sections or units.

As embodied, a conveyer section 20 is shown connected to or in operative relation with the main conveyer section at the left side thereof. The conveyer units are connected and held together in suitable manner and in Fig. 13 an angle or corner plate 21 has one reach 22 thereof abutting on the frame 3 of the primary or central conveyer and having a lug 24 fitting into a recess in the frame 3, and the other or perpendicular member 23 of the corner plate faces against the frame of the unit 20 and is detachably held into position by suitable means, such as a bolt 25.

The detachable drive means for the conveyer units, as embodied, referring more particularly to Figs. 3, 11 and 12, comprise a driving roller 26 journaled in the end of the frame of the conveyer unit 20, the roller having a gear 27 fixed thereto. A motor 28 has a base 29 adapted to rest on the mine bottom, and integral or attached plates 30 and 31 facing on the frame of the conveyer unit 20 and fastened thereto by suitable means, such as bolts 32 and 33. The motor shaft 34 projects inwardly through an opening 35 in the side frame of the conveyer unit 20, the pinion 36 meshing with the gear 27 to drive the conveyer.

While such a driving unit may be provided for each conveyer unit, there is shown in Figs. 14 and 15 a drive from one unit to another, as for instance if the left hand conveyer unit in Fig. 4 were driven from the conveyer unit 20 which is driven by the motor 28. In Figs. 14 and 15, the conveyer unit 40 is shown abutting on the unit 20. In this case the conveyer of the unit 20 is shown running over an idler roller 41 at its rear end, which roller is journaled in the conveyer frame, and is provided with a belt pulley or sprocket wheel 42. The conveyer of the unit 40 is driven by a roller 43, journaled in the frame of the unit, and having a belt pulley or sprocket wheel 44 attached thereto. A belt or sprocket chain 45 runs over the pulleys or sprocket wheels, passing through openings 46 in the frames of the conveyer units. The foregoing decription will suffice for the additional conveyer units employed, if any, two such units 50 and 51 being shown in Fig. 4. Suitable bridge plates 53 will be employed to carry the material from the conveyer of one unit to that of the next adjoining unit over the abutting frames of such units.

In the arrangement shown in Fig. 4 the central or principal conveyer may be operated alone until it is clear of the coal which has fallen thereon, and then either the right hand or left hand tranversely disposed conveyers may be started by means of their own motor drive, either simultaneously, thus discharging together the coal that has fallen on these conveyers onto the principal or central conveyer, or either the right hand or left hand conveyer may be emptied before the other conveyer is started. Also the various units arranged transversely at either side of the central or principal conveyer may be operated separately to discharge the front unit, and then together to discharge the back or rear conveyer unit over the front unit onto the central or principal conveyer. This can be done in the embodied form by having a separate motor for each of the transverse units or sections, or by disconnecting and then reconnecting the drives between the adjacent or abutting conveyer units.

Referring now to that feature of the invention relating to cooperating means or agencies for conveying away the coal from the already described conveyer or conveyers which cooperate directly with the dislodged coal which falls thereupon, in Fig. 1 a cooperating conveyer section 55 is shown taking coal from the principal or central conveyer. It is inclined upwardly and at its other end discharges the coal into a mine car 56. This conveyer may have its own motor, but in Figs. 1 and 10 it is shown driven from the driving roller 10 of the central or principal conveyer. The frame of the conveyer 55 is shown supported by means of pins 57 fixed thereto, projecting into apertures 58 in brackets 59 fixed to the end plate 2 of the central conveyer unit. The driving roller 60 of the conveyer 55 is driven by means of a belt or sprocket chain 61 from the pulley or sprocket wheel 62 fixed on the driving roller 10. The conveyer 55 may be supported in any suitable manner, the support being omitted from the drawings for the sake of clearness. A bridge plate 63 may be employed between the two conveyers in the usual manner.

In Figs. 4 and 5 of the drawings, the conveyer 55 is shown discharging the coal into the path or operative reach of a relatively fixed-path conveyer means, which will convey the coal along the room to a car in the entry, or between and to other desired parts of the mine. In the exemplified embodiment I have chosen to show it applied to a scraper line or conveyer line such as is shown and described in the co-pending application Ser. No. 266,505 of Kenneth Davis, filed December 12, 1918, now Patent 1,467,845, Sept. 11, 1923. Such endless conveyer cable is indicated by reference numeral 70, this cable passing about an inner sheave 71, this sheave being supported by a movable bearing upon an arm 72 supported by a jack post 73, substantially as shown and described in the Davis application. The scraper or scrapers 74 are attached by tow lines 75 to the cable 70. The remainder of the relatively fixed path conveyer mechanism may be substantially as shown in the Davis application, and need not be further shown and described in detail herein. A plate or chute 76 may be used at the discharge end of the conveyer 55 to advantageously direct the coal into the pathway of the traveling scrapers 74. The conveyer 55 may thus discharge continuously into a pile on the mine floor, as shown in Fig. 5, the piles of coal being taken by the scrapers 74 as they travel along a relatively fixed path or route, and the coal is discharged into a waiting mine car or other receptacle at the discharge end of the relatively fixed path conveyer.

The frames and the shoes 6 on the bottom of the frame are formed so that the conveyer units may be lifted and slid one on top of the other, and stacked, without disturbing the conveyers. This is done to allow the mining machine to pass in to make the new kerf or undercut as the beginning of a new dislodgment and conveying away operation.

In accordance with one feature of the invention, means are provided for moving a conveyer or the entire conveyer system or mechanism from the face of the room or other work to permit the mining machine to make a new undercut, and for then moving the conveyer or conveyer system forward into the undercut preparatory to "shooting down" or otherwise dislodging the coal and depositing it upon the conveyers.

In the illustrated embodiment (see especially Figs. 16 and 17), the winding drums are provided operating with cables or ropes which are attached to suitable anchorages such as jacks or jack posts, this mechanism as embodied being driven by the conveyer driving motor.

Referring thereto more in detail, the conveyer frames are arranged substantially as in Figs. 3 and 4. A winding drum 88 is driven from a motor 80 by means of a speed reducing gear and a friction drive clutch, both of any suitable form. As embodied, the motor 80 is mounted on a bed plate 81, which is bolted to the conveyer frames at various points as shown by 82. To the left of the motor 80 in Fig. 17 is shown a speed reducing gear 83, which may be of the encased planetary form. From the speed reducing gear 83 extends a shaft 78 journaled at 84 and connecting to a friction clutch 85. From clutch 85 extends a shaft 79 journaled at 86 and 87 and having fixed thereto the drum 88.

On the opposite side of the conveyer is provided a companion or cooperating winding drum also driven from motor 80 by a speed reducing gear and a friction clutch. As embodied, a speed reducing gear 89 is provided, driven from the motor. As shaft 95 driven thereby is journaled in a bearing 90, and extends through the central conveyer (the conveyer being driven therefrom as later described) and is also journaled in a bearing 91. A friction clutch 92 connects said shaft 95 to a shaft 96, journaled in bearings 93 and 94, the shaft having fixed thereon a winding drum 97.

When the conveyer system is to be moved to permit the mining machine to make a new undercut, cables 100 and 101 (Fig. 16) are connected to jacks or jackposts 102 and 103 and passed around the winding drums, and the system of conveyer units slide backwardly on their shoes 6, or rollers may be placed under the conveyer units if desired. It will be recalled that a conveyer section, such as section 51 may be disconnected from the others and lifted and slid over the other units to permit the passage of the mining machine at one side to the face of the work. The conveyer system is then practically in the position shown in Fig. 16.

To cause the conveyer mechanism to move itself forward to substantially the position shown in Fig. 4, that is, within the undercutting, the cables are connected to jacks or jack posts 104 and 105, the cables bearing preferably on guide rollers 106 and 107, which may be placed on the conveyer to bring the pull on the conveyer mechanism in the right direction. The winding mechanism may be employed to move single conveyers as well as a conveyer system and may be used in entry or long wall work as well if desired.

As previously indicated, in the embodiment of Figs. 16 and 17, the one motor 80 is also employed to drive the conveyers, the driving connections utilized being of any approved or convenient form. As embodied, and referring in detail to the illustrated mechanism, a sleeve 110 is mounted loosely on shaft 95, and is driven therefrom by a friction clutch 111. On sleeve 110 is fixed the driving roller 10 for the central conveyer section 5, thereby driving this section.

Conveyer section 20 (at the left in Fig.

17) is driven from sleeve 110 by means of a bevel gear 112 fixed on sleeve 110 and which meshes with a bevel gear 113 fixed on the shaft of roller 26, which roller drives conveyer section 20. A suitable clutch 114 is interposed between gear 113 and roller 26, to throw this section of the conveyer in and out.

Conveyer section 50 (at the right in Fig. 17) is driven by means of a bevel gear 120 fixed on sleeve 110, and meshing with a bevel gear 121 fixed on the shaft of the driving roller 26 of conveyer section 50. A suitable clutch 122 is interposed between the gear 121 and roller 26 to throw this section of the conveyer into and out of action. The journals for the shaft at the right of the central conveyer in Fig. 17 are mounted on a bed plate 125 detachably fixed to the conveyer unit frames by bolts 126.

In accordance with one feature of the invention, conveyer units are provided which are centrally divisible or separable so that the parts thereof may be separated and turned on edge against the entry or room rib or otherwise snugly stowed away even in veins of very small thickness.

In the illustrated embodiment of the divisible conveyer unit, two frames 130 and 131 are provided, which may be of the general form of those previously described, that is, with the outer vertically disposed, rectangularly arranged adjoining frames inclosing the conveyer itself and preferably the driving mechanism therefor.

Referring more particularly to Fig. 18, two conveyer frames such as have been described have their adjoining sides 132 and 133 abutting throughout their length, and their conveyers (omitted from Fig. 18 to show the driving mechanism) running alongside each other. A single motor is preferably employed to drive the two conveyers or the two sections of the conveyer together. A driving roller 134 is journaled in the end of one section of the conveyer of Fig. 18, and is driven by gearing 135 from a motor 136, mounted on a support 137 fixed to the conveyer frame.

The other part of the conveyer unit is driven from the mechanism just described. A roller 140 (Figs. 18 and 20) drives the conveyer section and is itself driven from motor 136, preferably through roller 134. As embodied, the end of shaft 141 of roller 134 has a square socket formed therein, and shaft 142 has a squared end fitting into the socket in shaft 141 when the two conveyer sections are fitted together. Motor 136 will thus drive the endless conveyers of both sections by means of their respective driving rollers 134 and 140.

These conveyer parts or sections are detachably held together in suitable manner, as by a hook 145, pivoted at 146 on one section, and taking over a lug 147 on the other section, and held in place by a bolt 148 screwed into the conveyer frame. The curved guide plates 7 may be employed at the back end of the sections or parts of the conveyer, and the edge supporting plates 16 may be employed on each section. Such a section will be found in practice sufficiently large to convey away all the dislodged coal from a heading or entry or other narrow work, and when the sections are disconnected they may be stacked on edge in any kind of work and in low veins ahead of the excavated or blasted out part of the top or bottom.

In Figs. 21 and 22, one form of conveyer is shown employing as the conveying device a plurality of driven rollers arranged parallel to each other in a plane at the top of the conveyer. Referring in detail to the embodied form, a rectangular frame, consisting of four vertically disposed joining plates 150, 151, 152 and 153, constitutes an external frame for the conveyer. In the side walls 150 and 152 are journaled a series of rollers 155, parallel and closely adjacent one to the other, the entire series of rollers together constituting a top to the conveyer along or over which the coal or other material is moved by the rotation of the rollers. The rollers are preferably fluted or corrugated and are so shown in the drawings.

Suitable driving or rotating means for the rollers are provided, and as embodied the shaft or pintle 156 of each roller has fixed thereon a sprocket wheel 157. A sprocket chain 158 extends lengthwise of the conveyer and is in mesh with each of the sprocket wheels 157. Sprocket chain 158 is driven in a suitable manner, and in Fig. 21 it is shown running over a sprocket wheel 159 connected directly or indirectly to the shaft of a motor 160. Motor 160 is mounted on a bed plate 161 which may be bolted to the front of the conveyer chain. A baffle plate 162 may be employed to direct the coal traveling along the conveyer away from the motor. A plate 166 is shown in Fig. 21 arranged to keep the coal or other material away from the sprocket chain and sprocket wheels.

In Fig. 23 is shown a form of device for driving one conveyer unit from another. On the end roller 155 in one conveyer unit is fixed a sprocket wheel 163, over which runs a sprocket chain 164. Chain 164 also runs over a sprocket wheel 165 fixed to the end roller 155 in the adjacent conveyer unit.

The invention in its broader aspects is not limited to the specific form of mechanism herein shown and described, but changes may be made therein without departing from the principles of the invention, and without sacrificing its chief advantages.

What I claim is:—

1. A coal conveying mechanism adapted to be placed in an undercut kerf to receive the undercut coal when dislodged, including in combination, a plurality of very thin and flat cooperating conveyer units lying horizontally on the mine floor and adapted to be slid into the undercutting and having conveying devices arranged substantially on the same level and one of said conveying devices discharging the dislodged coal to another of said conveying devices.

2. A coal conveying mechanism adapted to be placed in an undercut kerf to receive the undercut coal when dislodged, including in combination, a plurality of very thin and flat cooperating conveyer units lying horizontally on the mine floor and adapted to be slid into the undercutting and having conveying devices arranged substantially on the same level, said conveying device of one unit moving in a transverse direction with respect to the conveying device of another unit and discharging the dislodged coal to said conveying device of said other unit.

3. A coal conveying mechanism adapted to be placed in an undercut kerf to receive the undercut coal when dislodged, including in combination, a plurality of very thin and flat cooperating conveyer units lying horizontally on the mine floor and adapted to be slid into the undercutting and having continuously forwardly traveling conveying devices arranged substantially on the same level and one of said conveying devices discharging the dislodged coal to another of said conveying devices.

4. A coal conveying mechanism adapted to be placed in an undercut kerf to receive the undercut coal when dislodged, including in combination, a plurality of very thin and flat cooperating conveyer units lying horizontally on the mine floor and adapted to be slid into the undercutting and having continuously forwardly traveling conveying devices arranged substantially on the same level, said conveying device of one unit moving in a transverse direction with respect to the conveying device of another unit and discharging the dislodged coal to said conveying device of said other unit.

5. A coal conveying mechanism adapted to be placed in an undercut kerf to receive the undercut coal when dislodged, including in combination, a plurality of cooperating conveyer units having thin and flat external frames adapted to abut upon one another, and thin and flat conveying devices within said frames and arranged substantially upon the same level, and one of said conveying devices discharging the dislodged coal to another of said conveying devices.

6. A coal conveying mechanism adapted to be placed in an undercut kerf to receive the undercut coal when dislodged, including in combination, a plurality of cooperating conveyer units having thin and flat external frames adapted to abut upon one another, and thin and flat conveying devices within said frames and arranged substantially upon the same level, and one of said conveying devices moving in a transverse direction with respect to another of said conveying devices, and discharging the dislodged coal to another of said conveying devices.

7. A coal conveying mechanism adapted to be placed in an undercut kerf to receive the undercut coal when dislodged, including in combination, a plurality of cooperating conveyer units having thin and flat external frames adapted to abut upon one another, and thin and flat continuously forwardly traveling conveying devices within said frames and arranged substantially upon the same level, and one of said conveying devices discharging the dislodged coal to another of said conveying devices.

8. A coal conveying mechanism adapted to be placed in an undercut kerf to receive the undercut coal when dislodged, including in combination, a plurality of cooperating conveyer units having thin and flat external frames adapted to abut upon one another, and thin and flat continuously forwardly traveling conveying devices within said frames and arranged substantially upon the same level, and one of said conveying devices moving in a transverse direction with respect to another of said conveying devices, and discharging the dislodged coal to another of said conveying devices.

9. A coal conveying mechanism adapted to be placed in an undercut kerf to receive the undercut coal when dislodged, including in combination, a plurality of very thin and flat cooperating conveyer units lying horizontally on the mine floor and adapted to be slid into the undercutting and to abut one upon another, one of said units having a conveying mechanism traveling across and outwardly from the undercutting and discharging the dislodged coal at its outer end, and an adjacent unit having a conveying mechanism traveling along the undercutting and transversely to said first-mentioned conveying mechanism and delivering the dislodged coal thereonto, said conveying devices being arranged substantially on the same level.

10. A coal conveying mechanism adapted to be placed in an undercut kerf to receive the undercut coal when dislodged, including in combination, a plurality of very thin and flat cooperating conveyer units lying horizontally on the mine floor and adapted to be slid into the undercutting and to abut one upon another, one of said units having a conveying mechanism traveling across and outwardly from the undercutting and discharging the dislodged coal at its outer end, and an adjacent unit having a conveying mechanism traveling along the undercutting and transversely to said first-mentioned conveying mechanism and delivering the dislodged coal thereonto, said conveying devices being continuously forwardly running arranged substantially on the same level.

11. A coal conveying mechanism adapted to be placed in an undercut kerf to receive the undercut coal when dislodged, including in combination, a plurality of very thin and flat cooperating conveyer units lying flat upon the mine floor and adapted to be slid into an undercut kerf to receive the undercut coal when dislodged, a central unit extending across the undercutting and outwardly therefrom and conveying the dislodged coal across and out from the undercutting, and units at each side thereof arranged perpendicularly thereto and along the undercutting and delivering the dislodged coal to said first-mentioned conveyer, all said units having conveying devices arranged substantially on the same level.

12. A coal conveying mechanism including in combination a plurality of conveyer units having flat rectangular exterior frames adapted to lie horizontally upon the mine bottom and to be placed in an undercutting on a mine bottom, each conveyer frame enclosing an endless conveyer, to receive the undercut coal when dislodged, said conveyer frames being adapted to fit one against the other, and one conveyer feeding the coal on to another and one conveyer feeding in a direction perpendicular to another.

13. A coal conveying mechanism including in combination a plurality of cooperating conveyer units adapted to be placed in and to lie horizontally upon the mine bottom and to substantially fill an undercutting on a mine bottom to receive the coal when dislodged, at least one of said conveyer units running perpendicularly to the mine face and a plurality of the other cooperating conveyers running parallel to the mine face and feeding on to said first-mentioned conveyer, and means for driving one of said parallel running conveyers from another.

14. A conveyer unit adapted to be placed in an undercutting on a mine bottom and to receive the coal when dislodged and to convey it away, comprising in combination vertically disposed rectangularly arranged and joining exterior frame plates extending horizontally and lying flat upon the mine bottom, an endless conveyer within and filling the top of the frame, and driving means for the conveyer inclosed within the frame and conveyer.

15. A conveyer unit adapted to be placed in an undercutting on a mine bottom and to receive the coal when dislodged and to convey it away, comprising in combination vertically disposed rectangularly arranged and joining exterior frame plates extending horizontally and lying flat upon the mine bottom, an endless conveyer within and filling the top of the frame, and driving means for the conveyer inclosed within the frame and conveyer, and a shoe on the bottom of the frame on which it slides into the undercutting.

16. A conveyer unit adapted to be placed in an undercutting on a mine bottom and to receive the coal when dislodged and to convey it away, comprising in combination vertically disposed rectangularly arranged and joining exterior frame plates extending horizontally and lying flat upon the mine bottom, an endless conveyer within and filling the top of the frame, and driving means for the conveyer, including a driving roller and a motor inclosed within the frame and conveyer.

17. A conveyer unit adapted to be placed in an undercutting on a mine bottom and to receive the coal when dislodged and to convey it away, comprising in combination vertically disposed rectangularly arranged and joining exterior frame plates extending horizontally and lying flat upon the mine bottom, an endless conveyer within and filling the top of the frame, and driving means for the conveyer, including a driving roller within the frame and a motor attachable exteriorly to the frame.

18. A conveyer unit adapted to be placed in an undercutting on a mine bottom and to receive the coal when dislodged and to convey it away, comprising in combination vertically disposed rectangularly arranged and joining exterior frame plates extending horizontally and lying flat upon the mine bottom, an endless conveyer within and filling the top of the frame, said frame at one end being of greater height with a view to its projecting from the undercutting and driving means within said higher end of the conveyer.

19. A conveyer unit adapted to be placed in an undercutting on a mine bottom and to receive the coal when dislodged and to convey it away, comprising in combination vertically disposed rectangularly arranged and joining exterior frame plates extending horizontally and lying flat upon the mine bottom, an endless conveyer within and filling the top of the frame, said frame at one end being of greater height with a view to its projecting from the undercutting and driving means within said higher end of the conveyer, and including a driving roller and a motor therefor inclosed within the conveyer.

20. A coal conveying mechanism including in combination a plurality of cooperating conveyer units adapted to be placed in an undercutting on a mine bottom to receive the coal when dislodged and to convey it away, said conveyer units comprising vertically disposed rectangularly disposed external joining frame plates extending horizontally and lying flat upon the mine bottom, and an endless conveyer within and filling the top of the frame, the frames of the conveyer units fitting together within the undercutting, and the conveyers feeding the coal from one to the other.

21. A coal conveyer mechanism including in combination a plurality of cooperating conveyer units adapted to be placed in an undercutting on a mine bottom, to receive the coal when dislodged and to convey it away, said conveyer units comprising vertically disposed rectangularly arranged external joining frame plates extending horizontally and lying flat upon the mine bottom, and an endless conveyer within and filling the top of the frame, the frames of the conveyer units fitting together within the undercutting, with the end of one conveyer abutting on the side of another conveyer and the conveyers feeding the coal from one to the other.

22. A coal conveyer mechanism including in combination a plurality of cooperating conveyer units adapted to be placed in an undercutting on a mine bottom to receive the coal when dislodged and to convey it away, said conveyer units comprising vertically disposed rectangularly arranged external joining frame plates extending horizontally and lying flat upon the mine bottom, and an endless conveyer within and filling the top of the frame, the frames of the conveyer units fitting together within the undercutting, and the conveyers feeding the coal from one to the other, and means whereby said conveyers may be driven separately or together.

23. A coal conveyer mechanism including in combination a plurality of cooperating conveyer units adapted to be placed in an undercutting on a mine bottom to receive the coal when dislodged and to convey it away, said conveyer units comprising vertically disposed rectangularly arranged external joining frame plates extending horizontally and lying flat upon the mine bottom, and an endless conveyer within and filling the top of the frame, the frames of the conveyer units fitting together within the undercutting, the conveyers feeding the coal from one to the other, and means whereby said conveyers may be driven independently or one from another.

24. A coal conveyer mechanism including in combination a plurality of cooperating conveyer units adapted to be placed in an undercutting on a mine bottom to receive the coal when dislodged and to convey it away, said conveyer units comprising vertically disposed rectangularly arranged external joining frame plates extending horizontally and lying flat upon the mine bottom, and an endless conveyer within and filling the top of the frame, the frames of the conveyer units fitting together within the undercutting, and the conveyers feeding the coal from one to the other, a motor inclosed within one of said frames for driving said conveyer unit, and a motor attachable exteriorly to the frame of another conveyer unit to drive said unit.

25. A conveyer unit including in combination an exterior frame comprising vertically disposed rectangularly arranged joining plates, extending horizontally and lying along the mine bottom, and an endless conveyer substantially filling the top of the frame, a driving roller for the conveyer within the frame, and a motor attachable to the exterior of the frame and connected to drive the driving roller.

26. A coal conveying mechanism including in combination a plurality of cooperating conveyer units adapted to be placed in an undercutting, extending horizontally along and lying on a mine bottom to receive the coal when dislodged and to convey it away, said conveyers being adapted to convey the coal from one to another, and means for fastening the conveyers together in position for insertion into the undercutting to receive and convey away the dislodged coal.

27. A coal conveying mechanism comprising a plurality of low flat cooperating conveyer units, means for securing the units in cooperative relationship with one another, each of the units comprising in combination an endless conveyer having an upper reach directly over the lower reach whereby the lower reach is screened from down falling material, the units extending horizontally and lying flat on the mine bottom and adapted to slide into an undercut kerf in a mine face, bridge plates on substantially the same level as the upper reaches of the conveyers, for transferring the coal from one conveyer to the next, and means connected to the conveying mechanism for sliding it into the kerf.

28. A coal conveying mechanism comprising a plurality of low flat cooperating conveyer units, means for securing the units in cooperative relationship with one another, each of the units comprising in combination a flat endless conveyer which passes around horizontally extending direction changing devices at the front and rear, the units extending horizontally and lying along the mine floor, adapted to slide into an undercut kerf in a mine face, bridge plates on substantially the same level as the upper reaches of the conveyers, for transferring the coal from one conveyer to the next, and means, comprising a winding device fixed to the rear end of the conveying mechanism, for sliding it into the kerf.

29. A coal conveying mechanism comprising a plurality of low flat cooperating conveyer units, means for securing the units in cooperative relationship with one another, each of the units comprising in combination a flat endless conveyer, horizontally extending direction changing devices for the conveyer at the front and rear whereby the upper reach of the conveyer is directly over the lower reach thereof, the units extending horizontally and lying along the mine floor and adapted to slide into an undercut kerf in a mine face, bridge plates on substantially the same level as the upper reaches of the conveyers, for transferring the coal from one conveyer to the next, and means, comprising a motor drum fixed to the rear end of the conveying mechanism, for sliding it into the kerf.

30. A coal conveying mechanism comprising a plurality of low flat cooperating conveyer units, means for securing the units in cooperative relationship with one another, each of the units comprising in combination a flat endless conveyer having upper and lower reaches and adapted to lie along the mine floor and to slide into an undercut kerf in a mine face, the upper reach of the conveyer being directly above the lower reach thereof whereby the lower reach is screened from down falling material, bridge plates on substantially the same level as the upper reaches of the conveyers, for transferring the coal from one conveyer to the next, a drum for moving the conveying mechanism into a kerf, and a motor for operating the conveying mechanism and drum.

31. A conveyer mechanism including in combination a plurality of connected flat conveyer units each having an upper reach directly above its corresponding lower reach, adapted to move together into an undercut kerf in a mine, and a plurality of winding drums fixed thereto and cooperating to move all the connected units of the conveyer mechanism into the undercut kerf.

32. A conveyer mechanism including in combination a plurality of connected flat conveyer units each having an upper reach directly above its corresponding lower reach, adapted to move together into an undercut kerf in a mine, a motor driving selectively one or more of the conveyers, and means operated by the motor and mounted on one or more of said units for moving the conveyer mechanism into the undercutting.

33. A conveyer unit consisting of a plurality of separable side by side frames, each with an endless conveyer, the upper reach of which is directly above its corresponding lower reach, the several conveyers running in abutting contiguity, and connections for driving the several conveyers together.

34. A conveyer unit consisting of a plurality of separable side by side frames, each with an endless conveyer the upper reach of which is directly above its corresponding lower reach, the several conveyers running in abutting contiguity, and cooperating connections rendered operative by placing the conveyers side by side for driving the several conveyers together.

35. A conveyer unit consisting of a plurality of separable side by side frames, each with an endless conveyer the upper reach of which is directly above its corresponding lower reach, the several conveyers running in abutting contiguity, a conveyer driving motor mounted on one of said frames, and cooperating connections carried by the frames and brought into operative relationship when the frames are fitted together for driving the several conveyers together.

36. A conveyer unit consisting of a plurality of separable side by side frames, each with an endless conveyer the upper reach of which is directly above its corresponding lower reach, the several conveyers running in abutting contiguity, a conveyer driving motor mounted on one of said frames, and connections rendered operative by placing the conveyers side by side for driving the several conveyers together.

37. In combination with a conveying mechanism comprising a plurality of thin, flat cooperating conveying units lying horizontally on the mine floor and adapted to slide together into an undercut kerf, of means for driving the conveyers and means for moving the conveyers toward and from the mine face, and devices for connecting the conveyers together that they may be moved together by said moving means and for disconnecting a conveyer unit so that a mining machine may pass to and from the mine face to operate thereon alternately with the conveying mechanism.

38. A conveying system for loose material comprising a plurality of conveyer units, each of which comprises an endless conveyer the upper reach of which is directly over the lower reach, a frame for each of the conveyer units, means for securing successive frames in abutting relation, and bridge plates above the junction of abutting frames, for transferring the loose material from one unit to the next.

39. A conveying system for loose material comprising a plurality of conveyer units, each of which comprises an endless conveyer the upper reach of which is directly over the lower reach, a frame for each of the conveyer units, means for securing successive frames in abutting relation, interconnecting driving means extending from one conveyer to the next, and bridge plates above the junction of abutting frames, for transferring the loose material from one unit to the next.

40. A coal conveying mechanism including in combination a plurality of wide, low, flat conveying units, each of which comprises a frame, an endless belt conveyer carried by the frame, the upper reach of the belt screening the lower reach from downfalling material, each belt being nearly as wide as its frame whereby substantially the entire upper surface of each unit is a moving surface for carrying material, and means for securing the frames in abutting relation.

41. A coal conveying mechanism including in combination a plurality of wide, low, flat conveying units, each of which comprises a frame, an endless belt conveyer carried by the frame, the upper reach of the belt screening the lower reach from downfalling material, each belt being nearly as wide as its frame whereby substantially the entire upper surface of each unit is a moving surface for carrying material, means for securing the frames in abutting relation, and bridge plates above the junction of the abutting frames, for transferring the loose material from one unit to the next.

42. A coal conveying mechanism including in combination a plurality of wide, low, flat conveying units, each of which comprises a frame, an endless belt conveyer carried by the frame, the upper reach of the belt screening the lower reach from downfalling material, each belt being nearly as wide as its frame whereby substantially the entire upper surface of each unit is a moving surface for carrying material, means for securing the frames in abutting relation, bridge plates above the junction of the abutting frames, for transferring the loose material from one unit to the next, and interconnecting driving means extending from each unit to its adjacent unit.

43. A coal conveying mechanism including in combination a series of low, flat conveyer units adapted to lie on the mine floor, and to be connected together and to be slid into an undercut kerf made across a room face, preparatory to receiving the undercut coal when dislodged and a cooperating conveyer unit having its inner end in material-receiving relationship with one of the first-mentioned conveyer units and substantially on a level therewith, said cooperating conveyer unit being upwardly and rearwardly inclined to deposit from its outer end in a pile the coal received from said first-mentioned conveyers.

44. A coal conveying mechanism including in combination a series of low, flat conveyer units adapted to lie on the mine floor, and to be connected together and to be slid into an undercut kerf, made across a room face, preparatory to receiving the undercut coal when dislodged, the conveying mechanism of said unit being adapted to convey the dislodged coal along the room face, and a cooperating transverse conveying mechanism including a unit having its inner end substantially on the level of the first-mentioned conveyer units, the unit being inclined upwardly and rearwardly to discharge the conveyed material in a pile at the outer end thereof.

45. A coal conveying mechanism including in combination a series of low, flat conveyer units adapted to lie on the mine floor, and to be connected together and to be slid into an undercut kerf made across a room face, preparatory to receiving the undercut coal when dislodged, the conveyers of the various units being adapted to convey the dislodged coal across the room face, one of said units within the kerf being transversely arranged to receive the dislodged and conveyed coal from the other units and to convey it outwardly from the room face, and a conveyer unit cooperating with said transversely arranged unit, said cooperating unit having its inner end receiving the coal from said transversely disposed unit of the series, said cooperating unit being upwardly and rearwardly inclined to deposit the coal in a pile from the rear end thereof.

46. A coal conveying mechanism including in combination a series of low, flat conveyer units adapted to lie on a mine floor and to be slid into an undercut kerf made across a mine room, preparatory to receiving the dislodged coal, said units having rectangular frames, and endless conveyers mounted on said frames, winding means located at the rear sides of some of the frames of the conveyer units, posts adapted to be set in front of the undercutting, and cables attached to the posts and wound by said winding mechanisms whereby the conveyer units are slid past the posts into the undercut kerf.

47. A coal conveying mechanism including in combination a series of low, flat conveyer units adapted to lie on a mine floor and to be slid into an undercut kerf made across a mine room preparatory to receiving the dislodged coal, said units having rectangular frames, and endless conveyers mounted on said frames, means for firmly connecting the frames together, winding means located at the rear sides of some of the frames of the conveyer units, posts adapted to be set in front of the undercutting, and cables attached to the posts and wound by said winding mechanisms whereby all of the conveyer units are slid past the posts into the undercut kerf.

48. A coal conveying mechanism, including in combination a series of conveyer units, each comprising a low external frame adapted to lie on the mine floor, and an endless conveyer mounted within the unit frame and substantially filling the top of the frame, the units being adapted to be slid into an undercut kerf made across the face of a mine room, to receive the undercut coal when it is dislodged, the units being disposed to convey the dislodged coal along the room face, a cooperating conveying mechanism for receiving the coal from the first mentioned units and conveying it rearwardly away from the room face, and comprising a unit having a frame, and an endless conveyer mounted therewithin, upwardly and rearwardly inclined, and adapted to receive the coal from the first-mentioned units and to deliver it in a pile from the rear end of the unit, and bridge plates for conveying the coal from one conveyer to the next.

49. A coal conveying mechanism including in combination a series of conveyer units, each comprising a low external frame adapted to lie on a mine floor, and an endless conveyer mounted within the unit frame, and substantially filling the top of the frame, the units being adapted to be slid into an undercut kerf made across the face of a mine room, to receive the undercut coal when it is dislodged, a plurality of these units being disposed to convey the dislodged coal along the room face, and one of said units lying on the mine floor and being transversely disposed to receive the coal from the other units and convey it backwardly away from the room face, a conveyer unit having an upwardly and rearwardly inclined frame and an endless conveyer therein, the unit joining the last-mentioned conveyer unit and adapted to receive the coal therefrom at its forward end and convey it backwardly and upwardly and to deliver it in a pile from the rear end of the unit, and bridge plates for conveying the coal from one conveyer to the next.

In testimony whereof, I have signed my name to this specification.

RICHARD PEALE.